United States Patent [19]

Bell et al.

[11] Patent Number: 4,973,838

[45] Date of Patent: Nov. 27, 1990

[54] PULSED LASER BEAM DEVIATION APPARATUS

[75] Inventors: Charles E. Bell, Potomac; Jay S. Hall, Annapolis, both of Md.

[73] Assignee: The United States of America as represented by the Secretary of the Navy, Washington, D.C.

[21] Appl. No.: 257,433

[22] Filed: Apr. 24, 1981

[51] Int. Cl.$^5$ .............................................. H01J 3/14
[52] U.S. Cl. ................................ 250/234; 250/231.13
[58] Field of Search ............... 250/203, 216, 234, 235, 250/236, 231 SE; 356/141, 152

[56] References Cited

U.S. PATENT DOCUMENTS

| | | | |
|---|---|---|---|
| 4,049,349 | 9/1977 | Wennerstrom | 356/4 |
| 4,111,552 | 9/1978 | Bodlaj | 356/4 |
| 4,205,348 | 5/1980 | DeBenedictis et al. | 358/285 |

*Primary Examiner*—David C. Nelms
*Attorney, Agent, or Firm*—Kenneth E. Walden; John G. Wynn

[57] ABSTRACT

A pulsed laser beam aiming apparatus is configured such that substantially 100% of the energy from a pulsed laser beam from a Q-switched pulsed laser device is accurately aimed at a distant target/obstacle in space. The pulsed laser beam is reflected off of a multi-faceted polygonal mirror spinning about its axis and perpendicularly affixed to a rotatable azimuthal table wherein the spinning mirror provides elevational orientation, and, in conjunction with the rotatable azimuthal table, azimuthal orientation. Control circuit and associated equipment cause the Q-switched pulsed laser device to be triggered on when a facet of the mirror is in the proper elevational and azimuthal orientation for the pulsed laser beam to hit the target/obstacle. Correct aiming of the pulsed laser beam at the target/obstacle is accomplished when the coordinates thereof are specific only as an elevational angle ±5 above and/or below the horizon and an azimuthal angle between 0° and 360°.

6 Claims, 2 Drawing Sheets

4,973,838

PULSED LASER BEAM DEVIATION APPARATUS

BACKGROUND OF THE INVENTION

1. Field of the Invention

The present invention relates to an apparatus for aiming a pulsed laser beam at a distant target/obstacle in space to ascertain the range thereof, but more specifically, it relates to a laser beam deviation apparatus that uses multifaceted polygonal mirror, inter alia, to aim substantially 100% of the pulsed laser beam at the distant target/obstacle.

2. Description of the Prior Art

In the prior art, a need has been established for aiming a pulsed laser beam at a distant target/obstacle in space whose coordinates are specified only as some elevational angle above the horizon and some azimuthal angle between 0° and 360°. The elevational angle total deviation should be plus or minus 3° about a 0° deviation. The pulsed laser beam should be aimed at the distant target/obstacle in space in a time period not to exceed 300 microseconds.

Present laser beam deviator systems suffer from several deficiencies. Usually, the mirror scanner part of the system is limited to a set up time in the millisecond range. This is orders of magnitude greater than the desired 300 microseconds set up time previously mentioned. Additionally, in the case of acousto-optic type beam deflector systems, the maximum beam throughput available is only 20% to 50% of the energy.

Consequently, there is a need in the prior art for a laser beam deviation apparatus that will set up in 300 microseconds or less while providing substantially 100% of the pulsed laser beam fixed energy for aiming at the target/obstacle.

As background material, U.S. Pat. No. 4,205,348, filed Jul. 5, 1978, to DeBenedictis et al, entitled, "Laser Scanning Utilizing Facet Tracking and Acousto Pulse Imaging Techniques", disclose an apparatus for increasing the efficiency and resolution of a laser scanning system which uses, inter alia, a multifaceted polygonal mirror as a scanner to scan a laser beam across the surface of a recording medium. An acousto-optic Bragg cell is used to deflect the incident laser beam so as to follow one scanner facet of the multifaceted polygonal mirror during a complete scan and shift to the next facet for the following scan.

In DeBenedictis et al, the multifaceted polygonal mirror deflects the laser beam in one dimension only. The polygonal mirror in actuality is a single line scan type deflector and is used to provide angular deflection, i.e., angle multiplier. The acousto-optic (Bragg cell) beam type deflector is used to deflect and/or modulate the incident laser beam, i.e., move the laser beam but not turn it on and off. Accordingly, it is used to keep the incident laser beam in alignment with the polygonal mirror. The loss of throughput in a Bragg cell is unavoidable since whenever the laser beam is bent passing through the device a power loss is certain. This is so because the portion of the beam not deflected is equal to the loss in power of throughput. This amounts to a power loss of 50 to 80% as previously mentioned. The system of DeBenedictis et al will not function as intended without the use of the acousto-optic device described since it is necessary to move the laser beam rapidly across the medium. Thus, the "increase of efficiency" referred to is really an increase in scanning speed due to the use of the Bragg cell while the power efficiency is actually sacrificed, as previously mentioned.

Consequently, there is a need in the prior art to eliminate acousto-optic type devices from laser beam deviation apparatus and to use only a polygonal mirror to deflect the laser beam in two dimensions thereby increasing the system efficiency to substantially 100%.

The prior art, as indicated hereinabove, include many advances in laser beam deviation devices, including increases in scanning speeds. However, insofar as can be determined, no prior art beam deviation device incorporates all of the features and advantages of the present invention.

OBJECTS OF THE INVENTION

Accordingly, a principal object of the present invention is to reduce the set up time required for aiming a laser beam at a distant target/obstacle in space.

A further object of the present invention is to increase the maximum beam throughput (efficiency) of a laser beam deviation system to substantially 100%.

Yet another object of the present invention is to aim a pulsed laser beam at a distant target/obstacle in space whose coordinates are specified only as some elevational angle above the horizon and some azimuthal angle between zero (0) and 360 degrees in an improved manner.

SUMMARY OF THE INVENTION

In accordance with the above stated objects, other objects, features and advantages, the present invention has as a primary purpose to direct substantially 100% of a pulsed laser beam at a distant target/obstacle remote in space wherein the coordinates of the target/obstacle are specified only as some elevational angle above and/or below the horizon and some azimuthal angle. The foregoing is accomplished while reducing the temporal response of the system.

The essence of the present invention is in the use of a multifaceted polygonal mirror in a pulsed laser beam deviation system, the aforementioned mirror being rotatable about a vertical axis and spinable about a horizontal axis. These two degrees of freedom allow for accurate aiming of the pulsed laser beam at the target/obstacle when only the elevational angle and the azimuthal angle thereof are specified.

The purpose of the present invention is carried out by directing a pulsed laser beam of a Q-switched pulsed laser device at a spinning multifaceted polygonal mirror by timing the laser beam (pulsing it on/off) to be reflected from a facet thereof during a predetermined time in which the facet is aimed at the target/obstacle. A support fork operatively attached to the polygonal mirror is perpendicularly affixed to a rotatable azimuthal table. The spinning multifaceted polygonal mirror allows for proper orientation of the elevational angle, and in combination with the rotatable azimuthal table allows for the proper orientation of the azimuthal angle. A diode laser and a photodetector are disposed on the rotatable azimuthal table in a fixed relationship to the spinning polygonal mirror so as to sense the angular position thereof by providing a fiducial orientation in time as determined by the instant at which a beam from the diode laser is reflected from a facet of the spinning polygonal mirror onto the photodetector. The foregoing standard, inter alia, is used as a reference, along with elevational and azimuthal inputs from associated equipment, to drive a control circuitry which causes the Q-switched pulsed laser device to be triggered on and the beam thereof to be directed at a facet of the spinning polygonal mirror which is in the proper orientation for accurate deviation of the beam onto the desired target/obstacle in space.

BRIEF DESCRIPTION OF THE DRAWINGS

The previously stated objects, other objects, features and advantages of the present invention will be apparent from the following more particular description of a preferred embodiment as illustrated in the accompanying drawings, in which.

DESCRIPTION OF THE PREFERRED EMBODIMENTS

Figure 1:
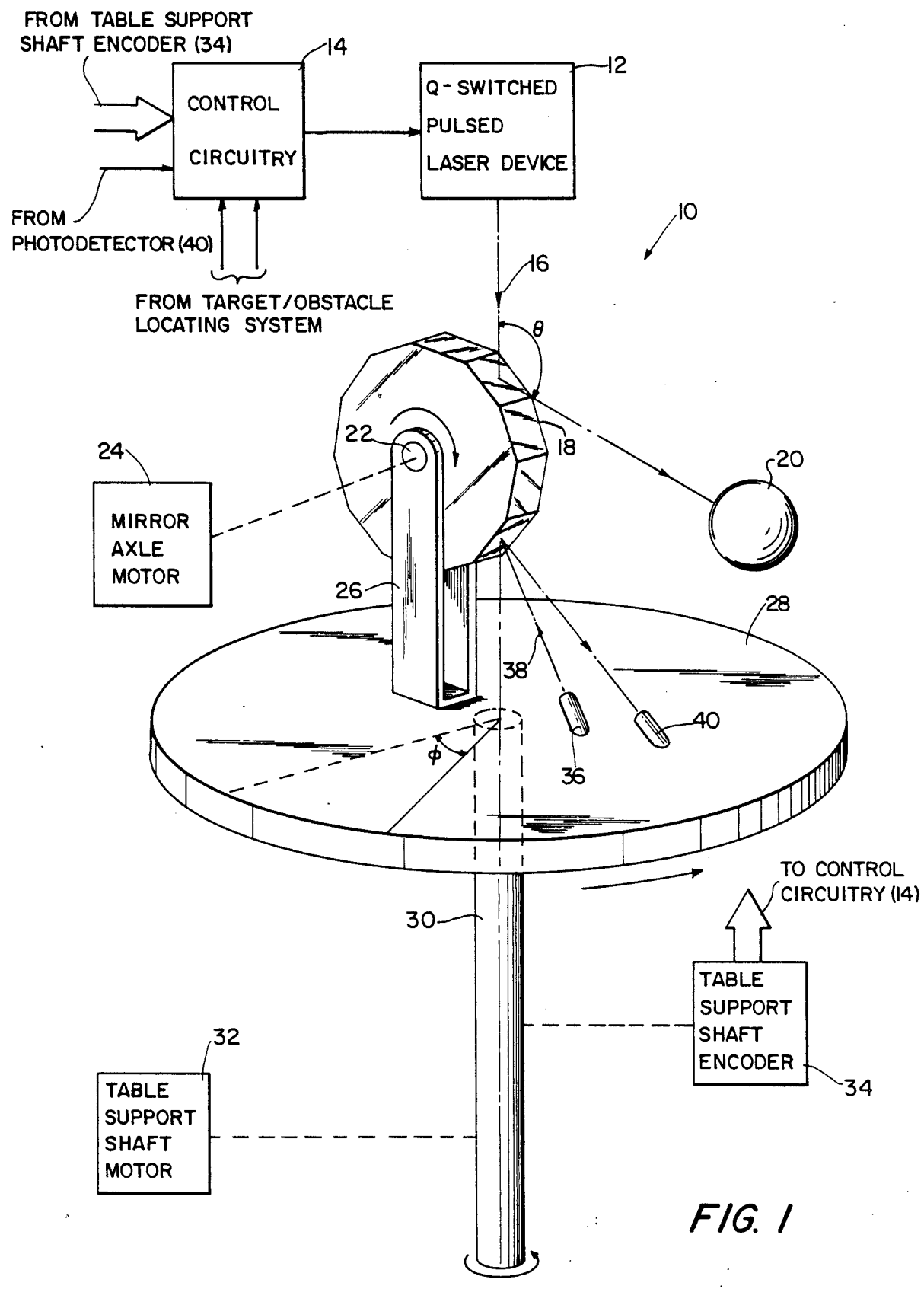
FIG. 1 is a schematic representation of the pulsed laser beam deviation apparatus according to the present invention depicting, inter alia, the arrangement of the multifaceted polygonal mirror in respect to other elements thereof.

FIG. 1 shows an embodiment of a pulsed laser beam deviation apparatus in which the present invention is employed to direct a Q-switched pulsed laser beam to a target/obstacle in distant space. Basically, a pulsed laser beam deviation apparatus 10 comprises a Q-switched pulse laser device 12 which is driven by a control circuitry 14. A pulsed laser beam 16 generated by Q-switched pulsed laser device 12 is directed onto a facet of a spinning multifaceted polygonal mirror 18 thereby accurately aiming pulsed laser beam 16 onto a target/obstacle 20. Multifaceted polygonal mirror 18 includes a spinning mirror axle 22 which is operatively connected to a mirror axle motor 24. This causes multifaceted polygonal mirror 18 to spin in the direction shown in mirror support fork 26. The mirror support fork 26 is operatively connected to the topside of a rotatable azimuthal table 28 adjacent the center thereof as defined by a vertical axis therethrough. Accordingly, as shown in the FIG. 1 a facet of multifaceted polygonal mirror 18 is on the center vertical of rotatable azimuthal table 28.

Perpendicular to the center underside of rotatable azimuthal table 28 and disposed and affixed for horizontal rotation about the vertical axis through the center thereof is an azimuthal table support shaft 30. Rotation of azimuthal table 28 is provided by a mechanical linkage of table support shaft motor 32 to table support shaft 30. As shown, counterclockwise rotation of rotatable azimuthal table 28 is provided. A table support shaft encoder 34 is operatively affixed to table support shaft 30. It provides a plurality of digital numbers corresponding to the azimuthal angle orientation of rotatable azimuthal table 28. More aspects of the foregoing will be discussed hereinafter in "The Statement of the Operation."

Continuing, table support shaft encoder 34 also is electrically connected to control circuit 14, aforementioned. A diode laser 36 generates a diode laser beam 38, and a photodetector 40 detects diode laser beam 38 after it is reflected off of a facet of multifaceted polygonal mirror 18. Diode laser 36 and photodetector 40 are affixed to the topside of rotable azimuthal table 28 and positioned so as to cooperate with spinning multifaceted polygonal mirror 18 to generate a reset pulse from photodetector 40. The reset pulse is fed to control circuitry 14. Additionally, the coordinates of target/obstacle 20 which are specified only as a signal cooresponding to an elevational angle ($\theta$) above and/or below the horizon, and another signal corresponding to an azimuthal angle ($\phi$) are both fed to control circuitry 14 from a target/obstacle locating system (not shown). For purposes of the invention, the target/obstacle locating system can be an infrared search system, a radar search system, or a television search system. The basic requirements that the search system be able to "see" a target/obstacle and be able to generate signals corresponding to the the elevational and azimuthal coordinates is all that is required. For purposes of the invention, the range of the target/obstacle is not required. Also, for purposes of the invention, Q-switched pulsed laser device 12 is well known and is a device that will immediately generate a pulsed laser beam in response to an electrical pulse input. Accordingly, a pulsed laser beam can be generated on demand.

STATEMENT OF THE OPERATION

Figure 2:
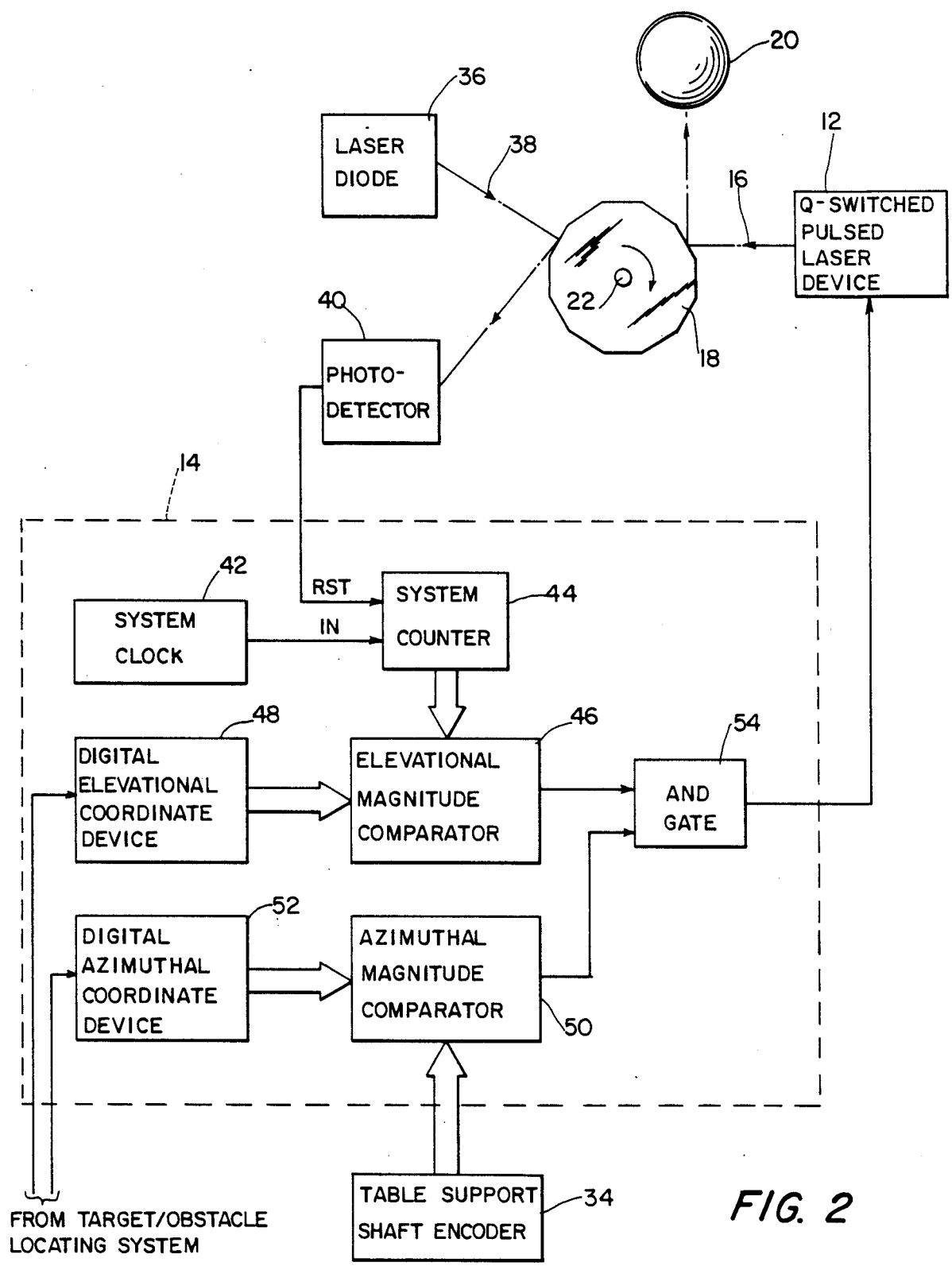
FIG. 2 is a block diagram representation of the electronic control circuitry of the pulsed laser beam deviation apparatus used for proper operation including timing, synchronizing and driving of the elements of the present invention depicted in FIG. 1.

Details of the operation, according to a preferred embodiment of the present invention, are explained in conjunction with FIGS. 1 and 2 viewed concurrently.

Control circuitry 14, depicted in detail in FIG. 2, comprises a system clock 42 for generating a plurality of clock pulses corresponding to a predetermined number (180) of resolution elements in the elevational field of view of a facet of multifaceted polygonal mirror 18. The output of system clock 42 is connected to an input of a system counter 44. The other input of system counter 44 the reset input, is driven by a rest pulse from photodetector 40 corresponding to an elevational angle orientation of multifaceted polygonal mirror 18 corresponding to a fiducial orientation in time. Accordingly, diode laser 36 and photodetector 40 coact with the multifaceted polygonal mirror 18 to sense the elevational angle position thereof. A facet of the aforementioned mirror has to be perpendicular to a center line between the photodetector and the diode laser before diode laser beam 38 is detected. Fiducial orientation in time is determined by the instant at which diode laser beam 38 is reflected into photodetector 40.

System counter 44 generates a plurality of digital numbers at its output corresponding to the predetermined number of elevational resolution elements. It encodes a digital number for each of the predetermined number of elevational resolutions elements. Laser diode 36, its laser diode beam 38 and photodetector 40, in cooperation with multifaceted polygonal mirror 18, as aforementioned, generate a reset pulse which causes system counter 44 to be synchronized in elevation with the mirror. For purposes of the invention, the reset pulse can be formulated to set system counter 44 to a zero (0) count or to a count corresponding to anyone of the predetermined elevational resolution elements. The output of system counter 44 drives one input of an elevational magnitude comparator 46. A digital elevational coordinate device 48 is operatively connected at its output to the other input of elevational magnitude comparator 46. Also, a signal from the target/obstacle locating system (not shown) corresponding to the elevational angle position of target/obstable 20 drives digital elevational such device 48 such that a digital number corresponding to each of the predetermined number of elevational resolution elements is fed to the other input of elevational magnitude comparator 46. In response, to the aforementioned inputs, elevational magnitude comparator 46 generates a trigger pulse at its output when the digital numbers at its inputs have the same count.

Likewise, an azimuthal magnitude comparator 50 is connected at one of its inputs to the output of table support shaft encoder 34, aforementioned. For purposes of the invention, table support shaft encoder 34 is a device that generates digital number corresponding to the azimuthal orientation rotatable azimuthal table 28. For a typical 360° of rotation, table support shaft encoder 34 will generate 16,384 different digital numbers with each number corresponding to 0.3 milliradian of azimuthal angle. Accordingly, everytime rotable azimuthal table 28 moves through 0.3 milliradian, table support shaft encoder 34 changes one digital number. In addition, table support shaft encoder 34 derives a reset function causing it to reset everytime azimuthal table 28 has gone through 360° of rotation. There is an index mark on table support shaft encoder 34 which indicates the position of the azimuthal table 28 relative to a ship, aircraft or like.

Still viewing FIGS. 1 and 2 concurrently, the combination diode laser 36, photodetector 40 and system clock 42 synchronizes the position of spinning multifaceted polygonal mirror 18 relative to rotatable azimuthal table 28. For purposes of the invention, multifaceted polygonal mirror 18 spins continuously at a speed of 1250 rps. Also, rotatable azimuthal table 28 typically rotates at 30 rps, not having to start up and/or stop the table and/or mirror is an important feature of the present invention since problem associated with start-up or stopping are eliminated.

Continuing, a digital azimuthal coordinate device 52 is operatively connected at its output to the other input of azimuthal magnitude comparator 50, aforementioned. A signal from the target-obstacle locating system (not shown) corresponding to the azimuthal angle of target/obstacle 20 is fed to digital azimuthal coordinate device 52 so that a digital number corresponding to a predetermined number of azimuthal resolution elements (16,384) is fed to other input of azimuthal magnitude comparator 50. Consequently, it generates an enabling pulse at its output when the digital numbers at its inputs have the same count. The outputs of elevational magnitude comparator 46 and azimuthal magnitude comparator 50 are connected to AND gate 54. With all concurrent signals at the input of AND gate 54 concurrent, it generates or passes a trigger pulse corresponding to the short duration output pulse of elevation magnetude composition 46. This pulse drives Q-switched pulsed laser device 12 on causing it to generate pulsed laser beam 16.

Since the laser beam deviation apparatus according to the present invention scans continuously through the desired region of space, accurate timing of pulsed laser beam 16 is important to hitting target-obstacle 20. For purposes of the invention, multifaceted polygonal mirror 18 should have 36 facets (only 12 shown for convenience of illustration); Therefore when spinning at 1250 rps it scans through 10° in 22 microseconds. Hence, 60 desired field of view in elevation is scanned in 13.2 microseconds. Further, it is desired to resolve the 60 field of view in elevation into 180 resolution elements with each resolution element corresponding to an area in space represented by 0.6 milliradians square. Thus, spinning multifaceted polygonal mirror 18, will scan through each elevational resolution element in 73 nsec. The 73 nsec per resolution element dwell time is consisted with prior art range finder laser characteristics in that the paused laser beam, for example, pulsed laser beam 16, for a variety of Q-switched pulsed laser devices, for example Q-switched pulsed laser device 12, which could be suitable laser sources, have output pulse durations of 30 nsec or less. Consequently, correct aiming of pulsed laser beam 16 is achieved by timing it to arrived at multifaceted polygonal mirror 18 during the 73 nsec time interval in which a facet thereof is aimed at the desired elevational resolution element. Correct timing of pulsed laser beam 16 is achieved by using a high speed digital timing circuit synchronized to spinning multifaceted polygonal mirror 18 and the rotation of rotatable azimuthal table 28. It is not necessary to synchronize together the spinning of the mirror and the rotation of the table. Provided that the proper reference timing signals are generated, it is sufficient to have one or two facets of spinning multifaceted polygonal mirror 18 scan through all the desired elevational angles during the time rotatable azimuthal table 28 addresses one azimuthal resolution element. For purposes of the invention, there are 16,384 azimuthal resolution elements, each resolution elements corresponding to an area in space represented by 0.6 milliradians square.

One technique for synchronizing or timing pulsed laser beam 16 is to use diode laser 36, photodetector 40 and multifaceted polygonal mirror 18 in combination as previously mentioned. A fiducial orientation in time is determined by the instance at which diode laser beam 38 is reflected into photodetector 40. This time is used as a reference for control circuitry 14 or more specifically as the source of a reset pulse for resetting system counter 44 thereof as shown in FIG. 2.

Referring then particularly to FIG. 2 and to reiterate, system clock 42 is used to divide each facet of multifaceted polygonal mirror 18 into the desired number of elevational resolution elements (180 in our case). This is achieved by making the operating frequency of system clock 42 proportional to the speed of rotation of multifaceted polygonal mirror 18. System counter 44 is used to encode digital the number of each elevational resolution element. Synchronizing of system counter 44 and multifaceted polygonal mirror 18 is obtained by using diode laser 36 and photodetector 44 with the appropriate interfaces to reset system counter 44 to zero (0) or a preset count as desired.

The azimuthal coordinate of target/obstacle 20 is fed to azimuthal magnitude comparator 50 which also receives the azimuthal orientation coordinates of rotatable azimuthal table 28 from table support shaft encode 34. When the elevational orientation of rotatable azimuthal table 28 coincides with the position of target/obstacle 20, the output of azimuthal magnitude comparator 50 goes to an up level or high output. Spinning multifaceted polygonal mirror 18 rapidly scans through the entire range of elevation angles ($\theta$) and when the count in system counter 44 equals the elevational coordinate, elevational magnitude comparator 46 generates a fast pulse or high level output for a short period of time. Since AND gate 54 is enabled by the azimuthal condition aforementioned, the pulse from elevational magnitude comparator 46 passes through AND gate 54 and, consequently, triggers on Q-switched pulsed laser device 12 generating pulsed laser beam 16 at the proper instance in time.

To those skilled in the art, many modifications and variations of the present invention are possible in light of the above teachings. It is therefore to be understood that the present invention may be practiced otherwise than as specifically described herein and still be within the spirit and scope of the appended claims.

What is claimed is:

1. A pulsed laser beam deviation apparatus for directing substantially 100% of a pulsed laser beam generated from a Q-switched pulsed laser device onto a distant target/obstacle in space wherein the coordinates of the target/obstacle are specified only as a signal corresponding to an elevational angle ($\theta$) above and/or below the horizon and another signal corresponding to an azimuthal angle ($\phi$), both of the signals being generated and fed to said pulsed laser beam deviation apparatus by a target/obstacle locating system, the improvement comprising;

a rotatable azimuthal table having a support shaft affixed perpendicularly to its center underside and being disposed for horizontal rotation about a center vertical axis through the center thereof;

means operatively connected to said support shaft for rotating said rotatable azimuthal table about the center vertical axis in a horizontal plane;

a shaft encoder operatively affixed to said support shaft for generating a plurality of digital numbers each corresponding to an azimuthal angle orientation of said rotatable azimuthal table;

a multifaceted polygonal mirror having an axle and disposed for spinning thereabout and being operatively connected to the topside of said rotatable azimuthal table via a mirror support fork adjacent the center of said rotatable azimuthal table so that the center of a facet of said multifaceted polygonal mirror is on the center vertical axis thereof;

means operatively connected to said axle for spinning said multifaceted polygonal mirror about a horizontal axis in an elevational plane perpendicular to the azimuthal plane of rotation of said rotatable azimuthal table;

means operatively affixed to said rotatable azimuthal table and positioned to operate with said multifaceted polygonal mirror for generating a reset pulse corresponding to an elevational angle orientation of a facet of said multifaceted polygonal mirror and corresponding to a fiducial orientation in time thereof; and a control circuitry operatively connected to said shaft encoder, said means for generating a reset pulse and said target/obstacle locating system for generating a trigger pulse for driving said Q-switched pulsed laser device causing it to switch into a high Q lasing condition thereby generating said pulsed laser beam.

2. The pulsed laser beam deviation apparatus of claim 1 wherein said plurality of digital numbers generated by said shaft encoder comprise 16,384 different numbers, each number corresponding to 0.3 milliradian of azimuthal angle ($\phi$) of a 360° total, and wherein said shaft encoder resets when said rotatable azimuthal table goes through 360°, there being an index mark on said shaft encoder for indicating the position of said rotatable azimuthal table.

3. The pulsed laser beam deviation apparatus of claim 1 wherein spinning multifaceted polygonal mirror is configured to include 36 facets and is operated continuously and at a predetermined speed of 1250 rps thereby being capable of scanning through an included elevational angle ($\theta$) of 10° in 22 $\mu$sec.

4. The pulsed laser beam deviation apparatus of claim 1 wherein rotatable azimuthal table is rotated continuously and at a predetermined speed of 30 rps.

5. The pulse laser beam deviation apparatus of claim 1 wherein said control circuitry further comprises:

a system clock for generating a plurality of clock pulses corresponding to a predetermined number of resolution elements in the elevational angle field of view of a facet of said multifaceted polygonal mirror;

a system counter operatively connected at one input to the output of said system clock and at its other input to the output of said means for generating a reset pulse for generating a plurality of digital numbers at its output corresponding to the predetermined number of resolution elements thereby encoding the digital number of each of said predetermined number of resolution elements, and said means for generating a reset pulse causing said system counter to be synchronized with said multifaceted polygonal mirror by generating a pulse to reset said system counter to zero (0) count or preset a count corresponding to anyone of the predetermined resolution elements;

an elevational magnitude comparator operatively connected at one of its inputs to the output of said system counter;

a digital elevational coordinate device operatively connected at its output to the other input of said elevational magnitude comparator and operatively connected at its input to the signal from said target/obstacle locating system corresponding to the elevational angle location of said target/obstacle such that a digital number corresponding to each of said predetermined number of resolution elements is fed to said other input of said elevational magnitude comprator, and such that said elevational magnitude comparator generates a trigger pulse at its output when the digital numbers at its inputs have the same count;

an azimuthal magnitude comparator operatively connected at one of its inputs to the output of said shaft encoder;

a digital azimuthal coordinate device operatively connected at its output to the other input of said azimuthal magnitude comparator and operatively connected at its input to the signal from said target/obstacle locating system corresponding to the azimuthal angle location of said target/obstacle such that a digital number corresponding to a predetermined number of azimuthal resolution elements is fed to said other input of said azimuthal magnitude comparator, and such that said azimuthal magnitude comparator generates an enabling pulse at its output when the digital numbers at its inputs have the same count; and an AND gate having one of its inputs operatively connected to the output of said elevational magnitude comparator and its other input operatively connected to said azimuthal magnitude comparator such that when both inputs of said AND gate are driven concurrently, indicating proper elevational and azimuthal coordinate orientation on the target/obstacle, it passes the trigger pulse from said elevational magnitude comprator which is fed to said Q-switched pulsed laser device thereby switching it on.

6. The pulsed laser beam deviation apparatus of claims 1 or 5 wherein said means for generating a reset pulse further includes a diode laser operatively attached to the topside of said rotatable azimuthal table such that a diode laser beam therefrom impinges on a facet of said multifaceted polygonal mirror, and a photodetector also attached to the topside of said rotatable azimuthal table adjacent said diode laser such that the diode laser beam therefrom is reflected from the same facet of said multifaceted polygonal mirror onto said photodetector when the diode laser beam strikes the geometric center of the same face thereby generating the reset pulse in response thereto.

* * * * *